Dec. 17, 1963    H. R. A. HANSEN    3,114,850
ELECTRIC CLUTCH REEL DRIVE ARRANGEMENT
Filed Feb. 18, 1960    5 Sheets-Sheet 1

INVENTOR.
Hans R. A. Hansen
BY
Byron, Hume, Groen, & Clement
Attys.

Dec. 17, 1963     H. R. A. HANSEN     3,114,850
ELECTRIC CLUTCH REEL DRIVE ARRANGEMENT
Filed Feb. 18, 1960     5 Sheets-Sheet 3

INVENTOR.
Hans R. A. Hansen

INVENTOR.
Hans R. A. Hansen

United States Patent Office 3,114,850
Patented Dec. 17, 1963

3,114,850
ELECTRIC CLUTCH REEL DRIVE ARRANGEMENT
Hans R. A. Hansen, Milwaukee, Wis., assignor to The Louis Allis Co., Milwaukee, Wis., a corporation of Wisconsin
Filed Feb. 18, 1960, Ser. No. 9,538
13 Claims. (Cl. 310—94)

The present invention relates to drive arrangements for continuous material process machines and particularly to systems and arrangements for regulating the drive arrangements and the coupling units therein.

Adjustable torque-speed drives utilizing eddy current clutch coupler units are widely used in commercial operations and it is conventional to employ such drives in continuous process operations, such as in the manufacture of paper, synthetic filaments, cloth and so forth. According to the particular usage of the drive, the control system therefor may regulate the power coupled to the driven unit, the tension in the material being processed by the driven unit, the linear speed of the material being processed by the driven device, the torque of the driven device and the angular speed of the driven device.

Giving more specific consideration to the problem of drive regulation in continuous process operations, it is to be understood generally that with variations in tension in a conveyed material, paper for example, a variation in quality of the paper may result. Similarly, any variation in linear speed of the processed material during the course of its run through the machinery may cause stretching or bunching and corresponding rupture or wrinkling of the material. Accordingly, each driven roll can be controlled in accordance with a different standard dependent upon the function that roll performs. Thus, a driven roll might be regulated in accordance with its measured power component, its torque, its angular speed, the linear speed of the material driven thereby, or the tension in the driven material. To completely understand this concept, it may be well to give consideration to the physical principles involved in any material process drive arrangement.

In any piece of material, the work performed in moving that material is a function of the tension F therein and the linear speed S at which the material is moving. This is true of the material at any point in its travel though the machine, assuming, of course, that the material at any of the points being measured is in the same condition of development. Accordingly, the rate of work at which work is done at any point along the material or power P, may be measured as follows:

(1) $$P = F \cdot S$$

where F is the tension in the material in pounds and S is the linear speed of the material measured in feet per second.

This equation can be a measure of the power performed, for example, at the tangential point where the material is wound onto a reel. At that same point, the power consumed in drawing the material onto the reel is measured by:

(2) $$P = T \cdot A$$

where T is the torque at the tangential point measured in foot pounds per revolution and A is the speed of the reel measured in revolutions per minute. Inasmuch as the power consumed in both instances is the same, it is apparent that:

(3) $$P = F \cdot S = T \cdot A$$

Knowledge of any two of these functions is sufficient for effecting machine control.

It is a general object of the present invention to provide a new and improved control arrangement for a drive including a transmission device wherein the control arrangement senses functions of the applied power in the machine operation and is directed in accordance with these functions for regulating the coupling in the transmission device.

A more specific object of the present invention is to provide an improved control arrangement for variable power drives including a magnetic clutch wherein the control arrangement senses functions of the power consumed in the drive operation and utilizes function multipliers for purposes of deriving a signal to control the coupling in the magnetic clutch.

A further object of the invention is to provide a control arrangement for a variable drive associated with a continuous flow arrangement wherein the power administered by the drive at any instance is controlled directly in accordance with the power functions sensed from the continuous flow arrangement.

Further objects and features of the invention pertain to the particular arrangements and structures whereby the above identified and other objects of the invention are attained.

The invention, both as to its scope and applications, will be better understood by reference to the following disclosure and the drawings forming a part thereof wherein.

Figures 1, 2:
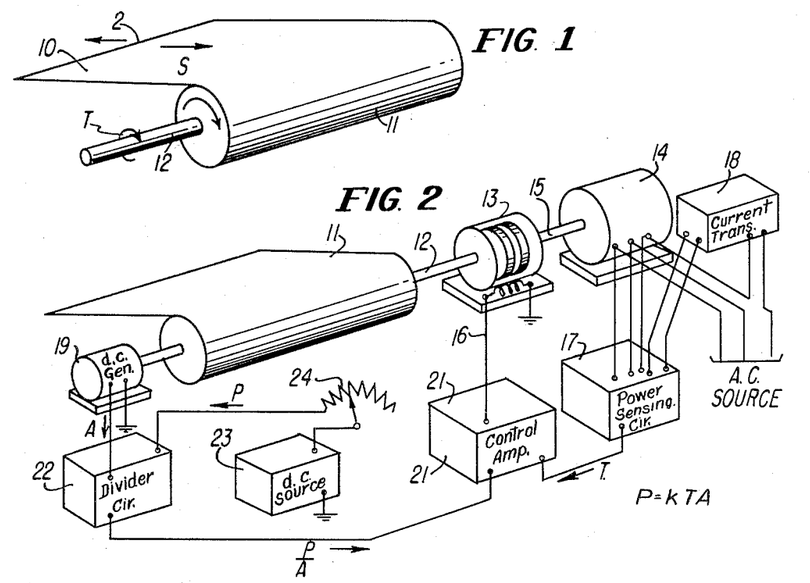
FIGURE 1 is a schematic representation of forces active on a material in a wind-up operation.
FIGURE 2 is a schematic representation of one control system incorporating the principles of the present invention for achieving constant power control.

As previously explained, and as shown in FIGURE 1, the work done at any portion of a piece of material 10 being operated on can be determined by the force F being exercised at any point, point 2 for example, in the material and the linear speed S at which the material is moving. The power that can be measured at this point is the same power being distributed to the material at the peripheral point 4 of the wind-up reel 11. The work at the periphery of the wind-up reel can be determined by measuring the torque T on the shaft 12 driving the reel 11 and the angular speed A of the shaft or reel.

Giving consideration to machinery employable for purposes of controlling and determining the torque and speed of a wind-up reel and accordingly the power applied to a wind-up reel, reference is made to FIGURE 2. Therein there is shown a reel 11 for winding up the material 10 driven by a shaft 12 from an eddy-current clutch 13. The drive member of the clutch 13 is connected to motor 14 via a shaft 15. Coupling between the input shaft 15 and the output shaft 12 is controlled by the coupling between the drive member and driven member of the clutch 13 and in accordance with the signal applied to the clutch at the terminal 16. The alternating current motor 14 is fed from an alternating current source. The torque T on the shaft 12 may be measured directly by a strain gauge, for example, but also, and for the assumed circumstance of a high efficiency constant speed motor the torque on the winder shaft 12 will be a measure of the watts input to the motor. Accordingly, the torque T on the shaft 12 can be expressed as:

(4) $$T \approx \bar{E} \cdot \bar{I}$$

where $\bar{E}$ is the vector voltage across the input terminals to the motor 14 and $\bar{I}$ is the vector current flow therethrough. A speed sensing device in the form of a tachometer generator 19 is connected to the shaft 12 for purposes of rendering a voltage output in accordance with the angular speed of the shaft.

A particular system devised for utilizing the principles of the present invention is illustrated in FIGURE 2. Therein the A.C. motor 14 drives an input shaft 15 of the clutch unit 13. The output shaft 12 of the clutch 13 drives the load or winder reel 11, the angular speed of which is detected by the tachometer generator 19. The amount of coupling in the clutch 13 is determined in accordance with the signal fed to the field coil at the terminal 16 from the control amplifier 21. The output from the tachometer generator 19 is fed to a divider circuit 22 which also receives the constant voltage signal administered from a D.C. source 23 via a variable resistor 24. The voltage so applied from source 23 is the standard of power to which the other variables will be balanced and controlled.

The power circuit 17 is the means utilized for deriving a measure of the torque applied to the shaft 12. The torque T is approximated in the power circuit 17 in accordance with the Equation 4, wherein preferably the current vector $\bar{I}$ is the current from a current transformer 18 connected in one phase conductor and the voltage vector $\bar{E}$ is the potential between the voltage in that phase conductor and the neutral voltage of all three phase conductors.

The control amplifier 21 is of a type having a condition of balance or a null condition where in response to a zero or other predetermined level of input signal there is provided an output to the terminal 16 for controlling the coupling in the clutch 13 to maintain the desired slip condition. Should the input to the control amplifier 21 vary from this balance condition signal to provide either a lesser or a greater signal, the output therefrom will be changed accordingly so as to control coupling in the clutch 13 in order to generate a signal for re-establishing the input voltage to the near null level. In the arrangement shown, the output of the power circuit 17 is a voltage corresponding to the torque T and the output from the divider 22 is a voltage corresponding to $$\frac{P}{A}$$

Both of these voltages are applied directly to the amplifier 21 for purposes of deriving a composite control signal. For a condition of balance, the relationship between the signals is:

(5) $$kT = \frac{P}{A}$$

This can be rewritten as:

(6) $$kT \cdot A = P$$

where $k$ is a constant.

In the circumstance, as in the present case, where P is a constant established within the circuit, the arrangement will provide a constant output wherein T is essentially fixed or at least very nearly proportional to the power input to the magnetic clutch 13. Accordingly, in response to any variation or fluctuation in line voltage or current to the motor 14 or in response to a change in angular speed at the shaft 12, the control amplifier 21 will be operated in a manner so as to achieve a coupling between the input shaft 15 and the output shaft 12 of the clutch 13 for maintaining the power applied to the load substantially constant. Specifically, the output of the amplifier 21 will vary inversely with variations in the output of the power circuit 17 and directly with variations in the output of the divider 22.

Figure 3:
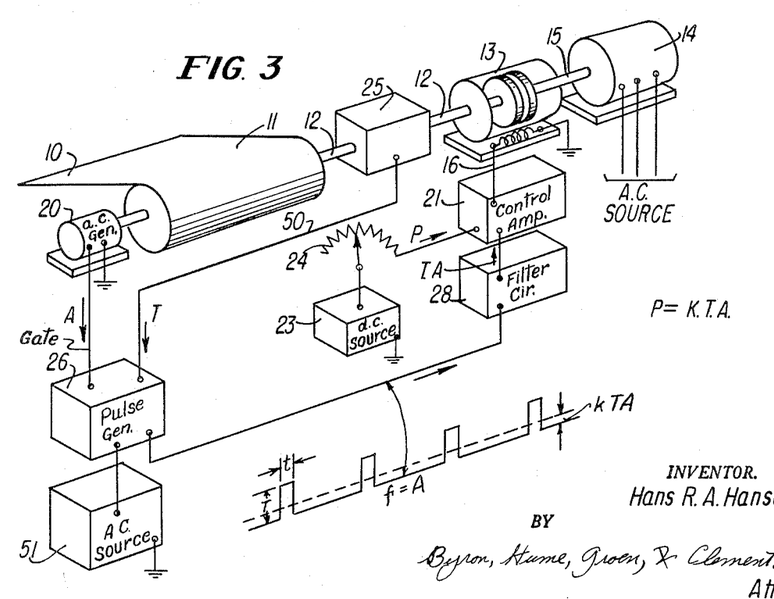
FIGURE 3 is a schematic representation of another arrangement for achieving constant power control.

Giving consideration to the arrangement shown in FIGURE 3, therein the speed sensing device for the shaft 12 is an alternating current generator which supplies its output to a pulse generator 26. In response to each full cycle, or alternatively each half cycle, of output from the generator 20, the pulse generator is triggered to produce a pulse of a constant width $t$. This output signal from the strain gauge arrangement 25 is applied to the pulse generator and controls the amplitude of the pulses developed therein. Accordingly, the chain of pulses provided to the filter circuit 28 is a function of angular speed A, torque T and a constant $k$.

Figure 15:
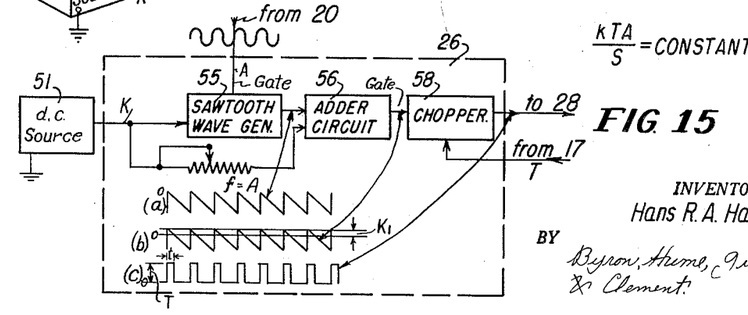
FIGURE 15 is a block schematic representation of a pulse generator with wave forms occurrent therein such as may be employed in the arrangements of FIGURES 3 and 5.

A circuit structure that may be employed as a pulse generator 26 for producing a chain of pulses is illustrated in FIGURE 15. Specifically, there is included therein a sawtooth wave generator 55 supplied from the D.C. source 51 and triggered in accordance with the frequency of the angular speed function signal A provided from the generator 20 thereby to produce a sawtooth wave as shown in waveform $a$ having a frequency $f$ corresponding to the function A. The output from the sawtooth wave generator 55 is applied to an adder circuit 56 which also has applied thereto a direct signal component $K_1$ from the source 51 through a variable resistor 57. This direct current component acts to shift the level of the base of the sawtooth wave signal provided from the generator 55 as shown in the pulse chain $b$. That portion of the signal above the base line is utilized as a gate signal to the chopper circuit 58 which is otherwise provided with a direct current signal corresponding to the torque function T. The output from the chopper circuit is then the direct current pulse chain having a reoccurrent frequency determined by the angular speed function A, each pulse having a fixed duration $t$ and having an amplitude corresponding to the torque function T. This signal is applied to the filter circuit 28. The adder circuit 56 is included only to illustrate means for selectively varying the pulse duration. In many instances pulse duration could be fixed by circuit wiring thereby avoiding the necessity for the inclusion of the adder circuit.

Figures 13, 14:
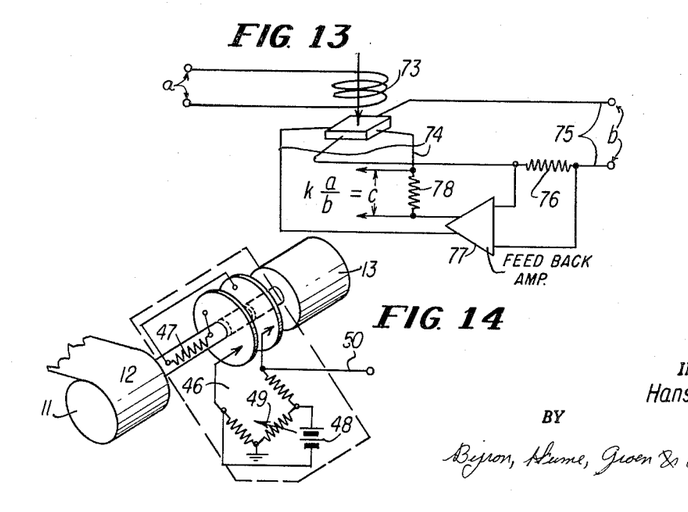
FIGURE 13 is a schematic representation of a Hall effect generator arranged to provide a divider output.
FIGURE 14 is a schematic representation of a torque sensing device that may be utilized in the scheme of the present invention.

Though the torque sensing device such as illustrated in FIGURE 2 may be utilized in the arrangement of FIGURE 3, for exemplary purposes the torque sensing device is here illustrated as a strain gauge arrangement 25 joined directly to the shaft 12. As the torque on the shaft varies, so also does the amplitude of the signal output from the arrangement 25. As best shown in FIGURE 14, the strain gauge arrangement may be a D.C. resistance bridge 46 in which one branch arm resistance 47 is fixed to the shaft 12 along the torsion shear line thereof so as to be elongated with increases in torsional forces on the shaft. The opposite branch arm 49 is a variable resistance employed for balancing the strain gauge resistor 49. Power is provided to the bridge from a source 48.

In the arrangement 25 shown, the resistance of the resistor 47 will vary directly with variations in torsions or torques on the shaft 12. By selective setting of the variable resistor 49, the bridge 46 may be made to produce in the output conductor 50 a signal directly in accordance with the torque on the shaft 12.

In the filter circuit 28, the chain of pulses from the pulse generator 26 are averaged and converted to provide a D.C. signal corresponding in composite to the amplitude of the output from the power circuit 17 and the frequency and width of the pulses from the pulse generator 26. In the control amplifier 21, the D.C. signal so derived is compared to the reference D.C. signal derived from the source 23 and the resistor 24 and the difference signal is utilized then to control the coupling in the clutch 13. The signal so derived is used to control coupling to achieve a condition balance wherein:

(7) $$kT \cdot A = P$$

Inasmuch as P, the power, is fixed, this arrangement will control the speed of the drive shaft 12 to effect constant power conditions in the load 11.

Figure 4:
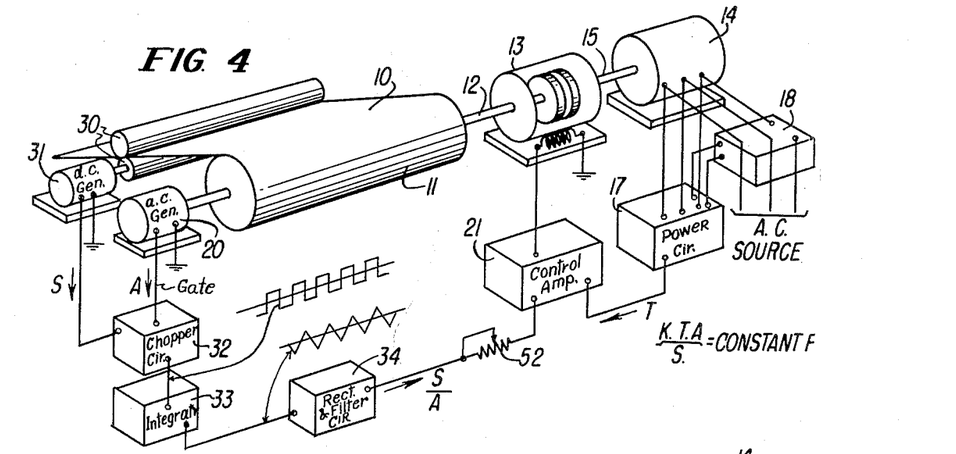
FIGURE 4 is a schematic representation of a balance system for controlling constant tension.

In FIGURE 4 there is illustrated a system for purposes of furnishing a constant tension control for the material 10 being wound on the reel 11. From a reference to the drawing, it will be noted that there is included all of the equipment identified in FIGURE 2 and in addition it includes a pair of idler rolls 30, which are rotated at the speed of movement of the material 10, and a D.C. generator 31 driven from one of the idler rolls for providing an output signal in accordance with the linear speed of the material 10. The arrangement illustrated is a balance system quite similar to that arrangement shown in FIGURE 2 wherein the control amplifier 21 provides an output signal to the clutch 13 in accordance with the magnitude and direction of unbalance between the signals applied thereto. The signal so provided to the clutch 13 is for purposes of regulating coupling in the clutch 13 thereby to achieve the condition of balance at the input to the amplifier 21.

In this particular arrangement, the direct current output from the D.C. generator 31 is applied to a chopper circuit 32 gated by the alternating current output from the A.C. generator 20. The output from the chopper circuit 32 is of a frequency corresponding to the output from the A.C. generator 20 and the amplitude of the signal is in accordance with the amplitude output from the D.C. generator 31. This signal is applied to an integrator circuit 33 and then through the rectifier and filter circuit 34 and the variable resistor 52 so that the output is effectively a voltage corresponding to $$\frac{S}{A}$$

where S is a linear speed of the material 10 and A is the angular speed of the drive shaft 12. For a condition of balance at the input to the amplifier 21, we have:

(8) $$\frac{S}{A} - kT = 0$$

Transposing this equation, we have:

(9) $$k\frac{T \cdot A}{S} = 1 = \text{a constant}$$

Inasmuch as this Equation 9 is also an expression for the measure of tension or force F in the material 10, it is clear that the arrangement of FIGURE 4 provides a constant tension control.

Figure 5:
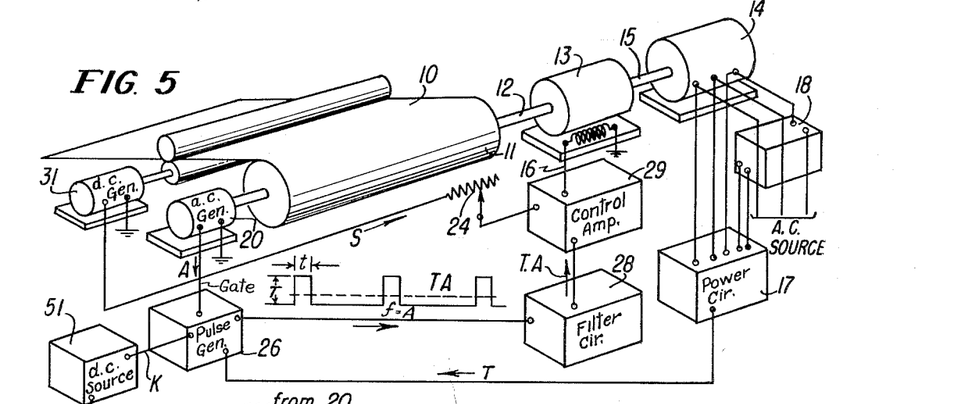
FIGURE 5 is a schematic representation of another balance system for achieving constant tension control.

A variation of the same arrangement for providing constant tension control is illustrated in FIGURE 5. This arrangement is practically identical to that shown in FIGURE 3, except that the D.C. input to the amplifier 29 is directly from the D.C. generator 31 and is compared against the output of the gate circuit 28. For a condition of balance in this arrangement:

(10) $$kT \cdot A = S$$

This can be rewritten as:

(11) $$k\frac{T \cdot A}{S} = 1 = \text{a constant}$$

As set forth above with regards to FIGURE 4, this is also an equation for expressing the tension in the material 10 so that the arrangement of FIGURE 5 is a constant tension device.

Figure 6:
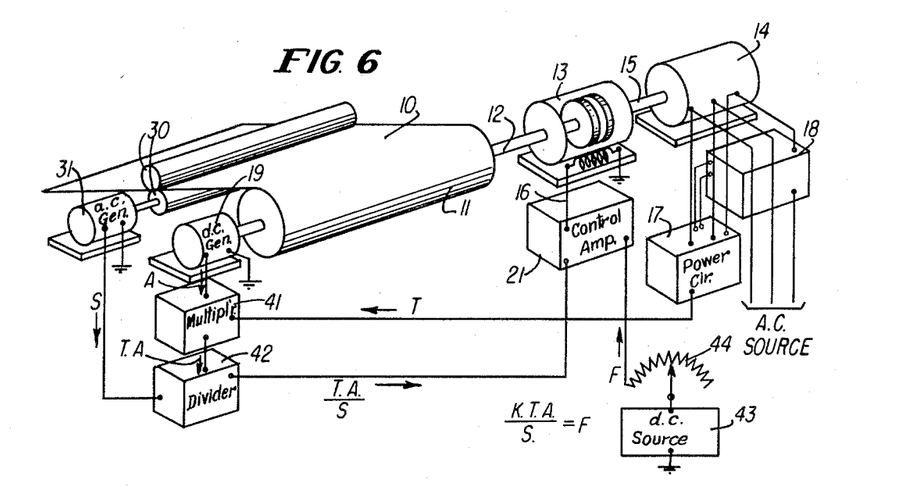
FIGURE 6 is a schematic representation of a further arrangement for achieving constant tension control.

In the arrangement of FIGURE 6, there is illustrated another constant tension arrangement wherein the angular speed detector 19 provides a signal which is multiplied with that of the power circuit 17 in a multiplier circuit 41. The output signal from the multiplier circuit 41 is applied to the divider circuit 42 wherein the signal is divided by the output from the direct current generator 31. The signal derived in the output of the divider 42 is matched in the amplifier 21 with the signal derived from a D.C. source 43 through a potentiometer 44. This latter D.C. signal is considered to be the adjustable tension signal F.

The amplifier 21 controls coupling at the clutch 13 in a manner so as to effect a balance between the signals applied to the control amplifier. In the circumstance of this balance condition, the following relationship is set up:

(12) $$k\frac{T \cdot A}{S} = F = \text{a constant}$$

Accordingly, when a given signal equivalent to F is set at the resistor 44, the rotational speed of the reel 11 will be controlled for purposes of varying the linear speed component and the angular speed control component to achieve a condition of balance.

Figure 7:
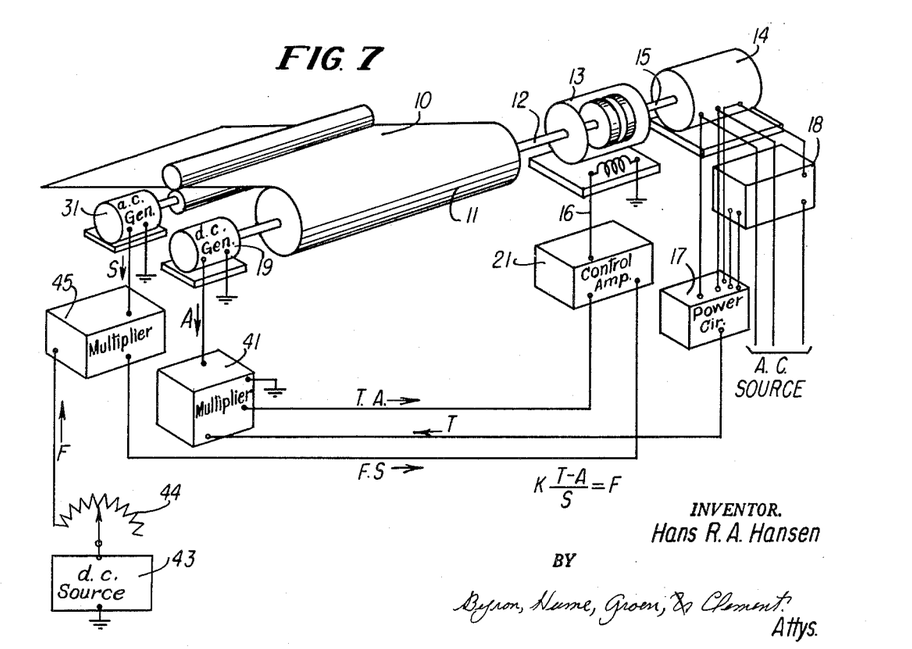
FIGURE 7 is a schematic representation of yet another arrangement for achieving constant tension control.

The arrangement of FIGURE 7 shows a further variation of that structure set forth in FIGURE 6, the only major difference being that the output of the multiplier 41 as applied directly to the amplifier 21 and the signal F from the source 43 is multiplied directly with the output S of the generator 31. These two signals, F and S, are mixed in a multiplier 45 which corresponds identically to multiplier 41. Suitable circuits that may be utilized for this multiplication function are discussed hereinafter. The signals from these two multiplier circuits 41 and 45 are applied to the amplifier 21 in opposition thereby to drive the control amplifier towards a condition of balance. This circuit provides the same type of constant tension control as provided by the circuit of FIGURE 6.

Figure 8:
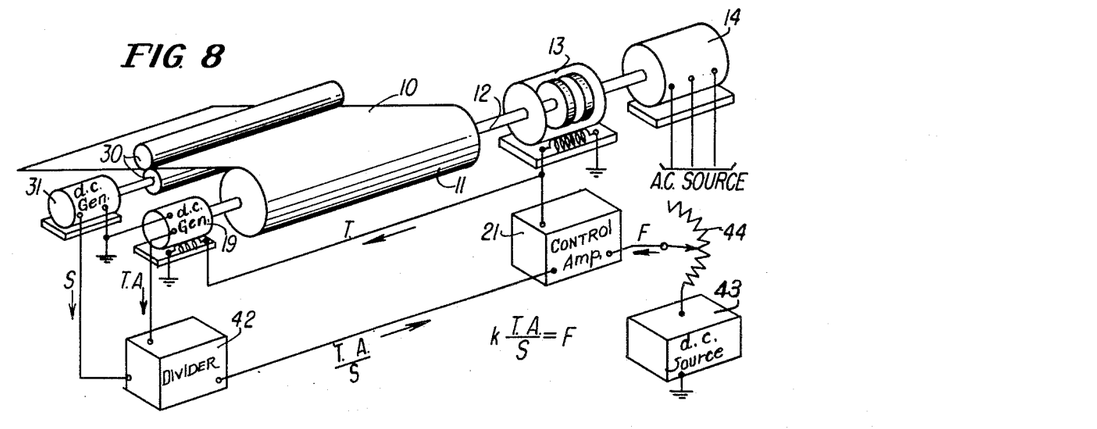
FIGURE 8 is a schematic representation of another varied system for achieving constant tension control in accordance with the principles of the present invention.

For a control within a limited range of speed and torque, the field current in the clutch winding is proportional to the torque on the output shaft. In the arrangement of FIGURE 8, this relationship is utilized for purposes of achieving multiplication within the D.C. tachometer generator 19 by energizing the field winding thereof in parallel with the field winding of the clutch unit 13. The output voltage from the D.C. generator 19 which is a function of torque T times angular speed A is applied to the divider unit 42 along with the output S from the D.C. generator 31. The output $$k\frac{T \cdot A}{S}$$

from the divider circuit is applied to the amplifier 21 in opposition to the signal F applied from the D.C. source 43 through the resistor 44 thereby to achieve a constant tension control in accordance with the relationship:

(13) $$\frac{A \cdot T}{S} \cdot k = F$$

where $k$ is a constant.

Figure 9:
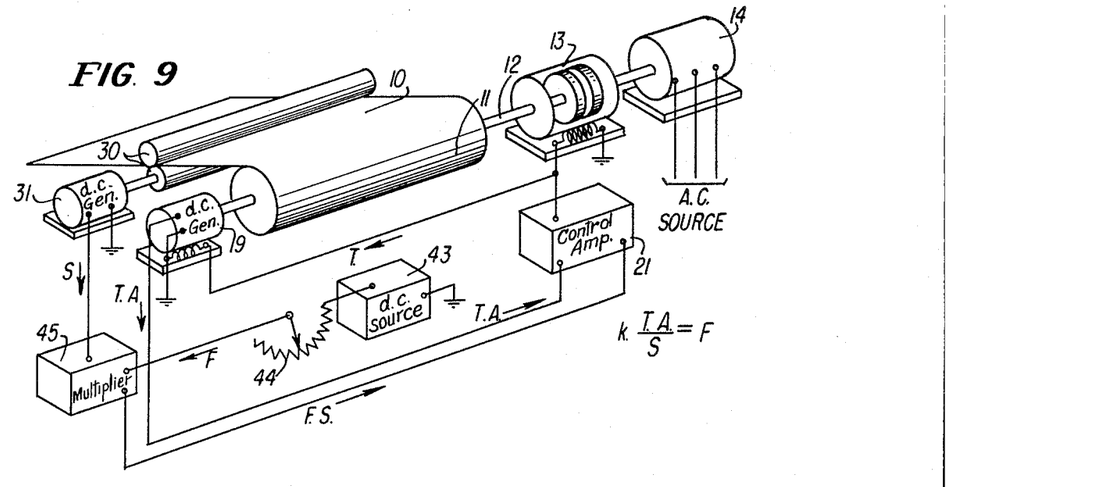
FIGURE 9 is a schematic representation of a further variation of systems for achieving constant tension controls.

The arrangement of FIGURE 9 is a modification of that arrangement shown in FIGURE 8. In this particular arrangement, the output S from the D.C. tachometer generator 32 is multiplied in the multiplier 45 with the tension signal F from the source 43 and potentiometer 44. The output ($F \cdot S$) from the multiplier circuit 45 is applied to the amplifier 21 in opposition to the output signal ($T \cdot A$) from the field controlled D.C. generator 19. The arrangement so described is an abbreviated constant tension device effective in the range where torque is proportional to field current.

Figure 10:
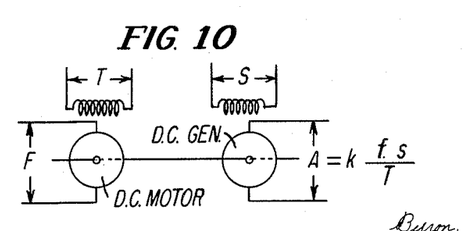
FIGURE 10 is a schematic representation of a particular multiplier-divider arrangement that can be used in the foregoing systems.

To provide some identification of well known exemplary circuits which can be utilized as multiplier units and as divider units in the various systems, reference is made to FIGURES 10 to 13. In FIGURE 10, there is shown a motor-generator set for which a voltage F is applied across the brushes of the motor and a current T is applied to its field winding and a current S is provided to the field winding of the generator. The output voltage A across the brushes of the generator is then equal to:

$$(14) \qquad k\frac{F \cdot S}{T} = A$$

This circuit can be utilized as a multiplier by making the current T to the motor field winding equal to a constant $k$, the input voltage F to the motor brushes variable, and the current S to the generator field variable. To utilize the arrangement as a divider either the motor brush voltage F or the generator field current S would be fixed with the other being variable and the motor field current T being variable.

Figure 11:
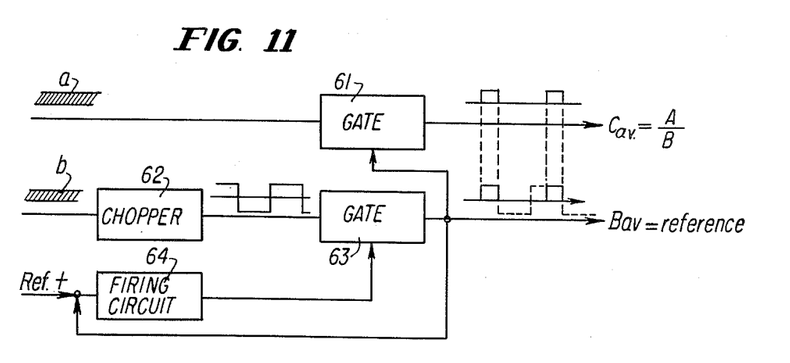
FIGURE 11 is a schematic representation of a divider circuit that can be utilized in the foregoing arrangements.

The arrangement of FIGURE 11 is illustrative of a more sophisticated arrangement for achieving a divider operation. Therein a D.C. voltage corresponding to one variable $a$ is applied to a gate circuit 61 and a D.C. voltage constituting the other variable $b$ is applied to a chopper circuit 62. The chopper circuit provides a pulsating output of an amplitude corresponding to that of the variable input signal to a gate circuit 63. The gate circuit 63 is fired (gated) from a firing circuit 64, the output of which is determined from a fixed reference signal and from a negative feedback signal from the output of the gate circuit 63. The firing circuit is arranged so that in response to a zero amplitude signal, the gate circuit 63 is triggered on, and in response to a large amplitude signal, the gate circuit is triggered off. This provides a pulsed D.C. output for which the average signal is a reference and is used to trigger the gate circuit 61. The gate circuit 61 then provides a pulsed D.C. signal $c$, the average of which is the function $a$ divided by the function $b$.

Figure 12:
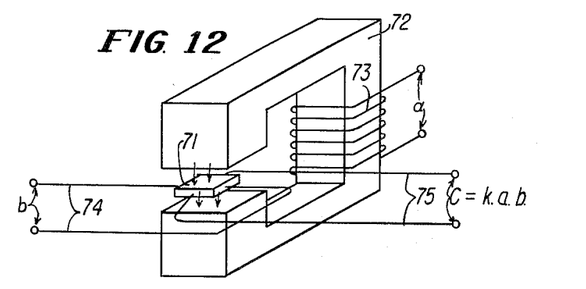
FIGURE 12 is a multiplier circuit employing a Hall effect generator arranged to provide a multiplier output.

In FIGURE 12, there is illustrated a Hall effect generator arranged to achieve multiplication. Therein the Hall effect crystal 71 is placed in the air gap of a magnetic core 72 carrying thereon an inductive winding 73. One pair of opposite faces of the Hall effect crystal 71 is provided with a pair of electrodes and conductors 74 and the other pair of faces in the same plane are provided with a pair of electrodes and conductors 75. Current corresponding to a signal $a$ supplied to the winding 73 creates a magnetic field and reacts with a current corresponding to a signal $b$ applied to the electrodes 74 for producing an output voltage or signal $c$ across the electrodes 75 bearing the relationships:

$$(15) \qquad c = k \cdot a \cdot b$$

where $k$ is a constant. Accordingly, this is a multiplier circuit.

FIGURE 13 illustrates a further variation of a Hall effect generator wherein a variable $a$ is applied to the winding 73 and another variable $b$ is applied to the pair of electrodes 75. In series with the conductors 75 is a load resistor 76, the output of which is applied to a negative feedback amplifier 77. The output of the amplifier 77 is connected across the pair of electrodes and conductors 74 in series with a load resistor 78. The voltage derived across the load resistor 78 corresponds to a signal $c$ and is a function of the signals $a$ and $b$. The relationship is:

$$(16) \qquad c = \frac{a}{b} \cdot k$$

From the foregoing description, it is obvious that there has been displayed and described herein a new and improved control function operator capable of regulating with a wind-up reel the various variables associated therewith. Specifically, there has been provided an arrangement that variously detects, responds to and controls the torque on a winding reel, the annular speed of the shaft driving the reel, the tension in the material being wound and the linear speed of the material being wound. It has been demonstrated that by carefully detecting and multiplying or dividing control functions, it is possible to provide power to a reel drive arrangement directly in accordance with the detected power in the material being wound, and control a drive arrangement in accordance with a selected constant tension value, a constant power value, a constant linear speed value, a constant torque value, or a constant angular speed value. By utilization of such function multipliers and dividers, it is possible to achieve exacting control through simplified circuitry not only in winding reel operations, but in any other continuous drive operation. Obviously, the control principles applied herein in terms of wind-up reel operations are directly applicable to reel unwinding operations.

The expositions in this case have been by way of exemplary description and it is understood that variations and modifications may be made therein without departing from the scope of the invention. It is intended to cover in the appended claims all such variations and modifications.

What is claimed is:

1. An arrangement for operating driven members in a continuous material processing machine, wherein the applied power function P and the product of the tension function F in the material and of the linear speed function S of the material and the product of the torque function T of any of said driven members and of the angular speed function A of said driven member bear a mutually determinative relationship to one another so that $$P = F \cdot S = T \cdot A$$

comprising a drive motor, a transmission device variably coupling said motor to one of said driven members, first control signal means providing a first control signal in accordance with said mutually determinative relationship from function signals corresponding to selected ones of said functions, second control signal means providing a second control signal in accordance with said mutually determinative relationship from function signals corresponding to others of said functions, said first and second control signals including a torque function signal, an inverse angular speed function signal and another function signal of an arbitrarily selected value, and control means responsive to said first and second control signals for establishing a coupling condition in said transmission device in accordance with the difference signal therebetween, said control means in response to a predetermined difference signal providing a selected coupling condition in said transmission device and establishing selected function signals in said first and second conrtol signal means, whereby in response to a variation from said predetermined difference signal said coupling condition is varied accordingly, thereby changing said function signals in a manner so as to achieve and maintain said predetermined difference signal.

2. An arrangement for operating driven members in a continuous material processing machine, wherein the applied power function P and the product of the torque function T of any of said driven members and of the angular speed function A of said driven member bear a mutually determinative relationship to one another so that $$P = T \cdot A$$

comprising a drive motor, a transmission device variably coupling said motor to one of said driven members, first control signal means producing function signals corresponding to at least two of said functions and including means for combining said function signals in accordance with said mutually determinative relationship thereby to provide a first control signal, second control signal means producing function signals corresponding to the other one of said functions thereby to provide a second control signal, said first and second control signals including an arbitrarily selected power function signal, a torque function signal and an inverse annular speed function signal, and control means responsive to said first and second control signals for establishing a coupling condition in said transmission device in accordance with the difference signal therebetween, said control means being arranged to provide a selected coupling condition in said transmission device in response to a predetermined difference signal thereby establishing said mutually determinative relationship between said first control signal and said second control signal, said control means being further arranged to respond directly in accordance with one of said first and second control signals and inversely in accordance with the other of said first and second control signals, whereby in response to a variation from said mutually determinative relationship between said first control signal and said second control signal said difference signal is varied so as to vary said coupling condition accordingly and change said selected function signals thereby to re-establish said mutually determinative relationship.

3. The arrangement set forth in claim 2 wherein said predetermined difference signal is of zero magnitude.

4. The arrangement set forth in claim 2 wherein said torque function signal is detected and measured at said drive motor in accordance with the power utilized thereat.

5. An arrangement for operating driven members in a continuous material processing machine, wherein the applied power function P and the product of the torque function T of any of said driven members and of the angular speed function A of said driven member bear a mutually determinative relationship to one another so that $$P = T \cdot A$$

comprising a drive motor, a transmission device variably coupling said motor to one of said driven members, first control signal means including angular speed detector means for producing angular speed function signals and including a source for producing arbitrarily selectable power function signals and including function divider means for dividing said power function signal by said angular speed function signal thereby to provide a first control signal, second control signal means including torque detector means for producing a torque function signal thereby to provide a second control signal, and control means responsive to said first and second control signals for establishing a coupling condition in said transmission device in accordance with the difference signal therebetween, said control means being arranged to provide a selected coupling condition in said transmission device in response to a predetermined difference signal thereby establishing said mutually determinative relationship between said first control signal and said second control signal, whereby in response to a variation from said mutually determinative relationship between said first control signal and said second control signal said difference signal is varied so as to vary said coupling condition accordingly and change said selected function signals thereby to re-establish said mutually determinative relationship.

6. An arrangement for operating driven members in a continuous material processing machine, wherein the product of the tension function F in the material and of the linear speed function S of the material and the product of the torque function T of any of said driven members and of the angular speed function A of said driven member bear a mutually determinative relationship to one another so that $$F \cdot S = T \cdot A$$

comprising a drive motor, a transmission device variably coupling said motor to one of said driven members, first control signal means producing function signals corresponding to said angular speed function and said torque function and said linear speed function and including function multiplier means and function divider means for combining said function signals in accordance with said mutually determinative relationship thereby to provide a first control signal, second control signal means providing a function signal corresponding to said tension function and thereby providing a second control signal, and control means responsive to said first and second control signals for establishing a coupling condition in said transmission device in accordance with the difference signal therebetween, said control means being arranged to provide a selected coupling condition in said transmission device in response to a predetermined difference signal thereby establishing said mutually determinative relationship between said first control signal and said second control signal, whereby in response to a variation from said mutually determinative relationship between said first control signal and said second control signal said difference signal is varied so as to vary said coupling condition accordingly and change said selected function signals thereby to re-establish said mutually determinative relationship.

7. The arrangement set forth in claim 6 wherein said tension function signal is arbitrarily selected from an independent source and the other of said function signals are detected from said machine.

8. An arrangement for operating driven members in a continuous material processing machine, wherein the product of the tension function F in the material and of the linear speed function S of the material and the product of the torque function T of any of said driven members and of the angular speed function A of said driven member bear a mutually determinative relationship to one another so that $$F \cdot S = T \cdot A$$

comprising a drive motor, a transmission device variably coupling said motor to one of said driven members, first control signal means producing function signals corresponding to said torque function and said angular speed function and including function multiplier means for combining said function signals to provide a first control signal, second control signal means producing function signals corresponding to said tension function and to said linear speed function and including function multiplier means for combining said function signals to provide a second control signal, and control means responsive to said first and second control signals for establishing a coupling condition in said transmission device in accordance with the difference signal therebetween, said control means being arranged to provide a selected coupling condition in said transmission device in response to a predetermined difference signal thereby establishing said mutually determinative relationship between said first control signal and said second control signal, whereby in response to a variation from said mutually determinative relationship between said first control signal and said second control signal said difference signal is varied so as to vary said coupling condition accordingly and change said selected function signals thereby to re-establish said mutually determinative relationship.

9. An arrangement for operating driven members in a continuous material processing machine, wherein the product of the tension function F in the material and of the linear speed function S of the material and the product of the torque function T of any of the said driven members and of the angular speed function A of said driven member bear a mutually determinative relationship to one another so that $$F \cdot S = T \cdot A$$

comprising a drive motor, a transmission device variably coupling said motor to one of said driven members, first control signal means producing function signals corresponding respectively to said linear speed function and to said angular speed function and including a function divider for combining said function signals in accordance with said mutually determinative relationship thereby to provide a first control signal, second control signal means providing a function signal corresponding to said torque function and therefrom providing a second control signal, and control means responsive to said first and second control signals for establishing a coupling condition in said transmission device in accordance with the difference signal therebetween, said control means being arranged to provide a selected coupling condition in said transmission device in response to a predetermined difference signal thereby establishing said mutually determinative relationship between said first control signal and said second control signal, whereby in response to a variation from said mutually determinative relationship between said first and second control signals said difference signal is varied so as to vary said coupling condition accordingly and change said selected function signals thereby to reestablish said mutually determinative relationship.

10. The arrangement set forth in claim 9 wherein said means for producing said linear speed function signal is a direct current generator, said means for producing said angular speed function signal is an alternating current generator, and said function divider includes a chopper circuit and an integrator circuit and a rectifier and filter circuit, wherein said chopper circuit provides an alternating current signal of an amplitude in accordance with the linear speed function and of a frequency in accordance with the angular speed function, and wherein said integrator and said rectifier and filter circuits operate thereon for providing said first control signal from said alternating current signal.

11. An arrangement for operating driven members in a continuous material processing machine, wherein the product of the tension function F in the material and of the linear speed function S of the material and the product of the torque function T of any of said driven members and of the angular speed function A of said driven member bear a mutually determinative relationship to one another so that $$F \cdot S = T \cdot A$$

comprising: a drive motor for providing a substantially constant power output; a transmission device variably coupling said motor to one of said driven members; first control signal means including an alternating current generator producing function signals of a frequency corresponding to said angular speed function, a torque detector associated with said driven member producing function signals of an amplitude corresponding to said torque function on said member, a pulse generator triggered from said alternating current generator and controlled from said torque detector for producing a chain of pulses having an occurrent frequency corresponding to the output of said alternating current generator and having an amplitude corresponding to the output of said torque detector, and a filter circuit for producing a direct current first control signal in accordance with the frequency and the amplitude of the pulses in said chain so that the first control signal corresponds to the mutually determinative relationship $T \cdot A$; second control signal means providing a function signal corresponding to said linear speed function and therefrom providing a second control signal; and control means responsive to said first and second control signals for establishing a coupling condition in said transmission device in accordance with the difference signal therebetween; said control means being arranged to provide a selected coupling condition in said transmission device in response to a predetermined difference signal thereby establishing said mutually determinative relationship between said first control signal and said second control signal; whereby in response to a variation from said mutually determinative relationship between said first control signal and said second control signal said difference signal is varied so as to vary said coupling condition accordingly and change said selected function signals thereby to re-establish said mutually determinative relationship.

12. The arrangement set forth in claim 11 wherein said pulse generator includes a wave generator operative at a frequency corresponding to the frequency of the signal derived from the alternating current generator, each said wave being of a predetermined duration and duty cycle, and a chopped circuit gated on during each wave period in accordance with the duty cycle thereof for providing an output pulse of an amplitude corresponding to the output from said torque detector.

13. The arrangement set forth in claim 11 wherein said pulse generator includes a sawtooth wave generator operative at a frequency corresponding to said angular speed function signal, means for selectively biasing the output of the sawtooth wave generator for controlling the amplitude of the signal excursion from a reference base, and a chopper circuit gated on for an interval corresponding to the duration of the signal excursion beyond said base line for providing an output pulse corresponding to the amplitude of the signal provided from the torque detector.

References Cited in the file of this patent

UNITED STATES PATENTS

| | | |
|---|---|---|
| 2,702,872 | Jaeschke | Feb. 22, 1955 |
| 2,777,964 | Di Mino | Jan. 15, 1957 |
| 2,850,654 | Jaeschke | Sept. 2, 1958 |
| 2,943,809 | Garrett | July 5, 1960 |
| 2,949,249 | Gravenstreter et al. | Aug. 16, 1960 |